United States Patent [19]

Sturm

[11] Patent Number: 4,928,906
[45] Date of Patent: May 29, 1990

[54] REMOTE CONTROL SYSTEM FOR A ROLLING FLYING BODY

[75] Inventor: Richard Sturm, Ottobrunn, Fed. Rep. of Germany

[73] Assignee: Messerschmitt-Boelkow-Blohm Gesellschaft mit beschraenkter Haftung, Munich, Fed. Rep. of Germany

[21] Appl. No.: 300,960

[22] Filed: Jan. 23, 1989

[30] Foreign Application Priority Data

Jan. 22, 1988 [DE] Fed. Rep. of Germany ....... 3801795

[51] Int. Cl.$^5$ ............................................ F42B 15/033
[52] U.S. Cl. ................................................... 244/3.22
[58] Field of Search ......................................... 244/3.22

[56] References Cited

U.S. PATENT DOCUMENTS

| | | | |
|---|---|---|---|
| 3,184,182 | 5/1965 | May | 244/3.22 |
| 3,807,660 | 4/1974 | Le Corviger et al. | 244/3.22 |
| 3,926,390 | 12/1975 | Teuber et al. | 244/3.22 |
| 4,482,107 | 11/1984 | Metz | 244/3.22 |
| 4,681,283 | 7/1987 | Kranz | 244/3.22 |
| 4,712,747 | 12/1987 | Metz et al. | 244/3.22 |

Primary Examiner—Charles T. Jordan
Attorney, Agent, or Firm—W. G. Fasse; D. H. Kane, Jr.

[57] ABSTRACT

A remote control for a rolling flying body enables that body to also perform pitching movements about its pitch axis and yawing movements about its yaw axis. For this purpose the flying body is equipped with a plurality of control nozzles distributed about the circumference of the flying body. These control nozzles or rather the fluid flow through the control nozzles is so controlled by control valves that two nozzles forming a pair are simultaneously activated for causing the desired pitching and yawing movements. The duration of the control impulse signals is determined exclusively by the rolling frequency of the flying body or missile.

9 Claims, 8 Drawing Sheets

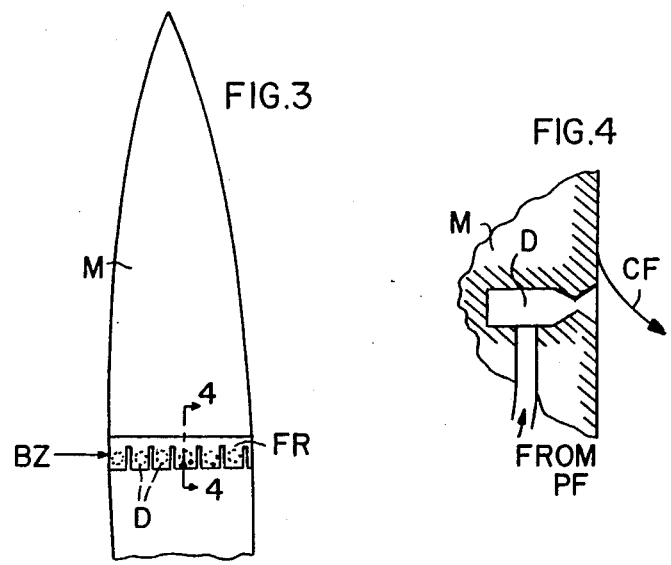
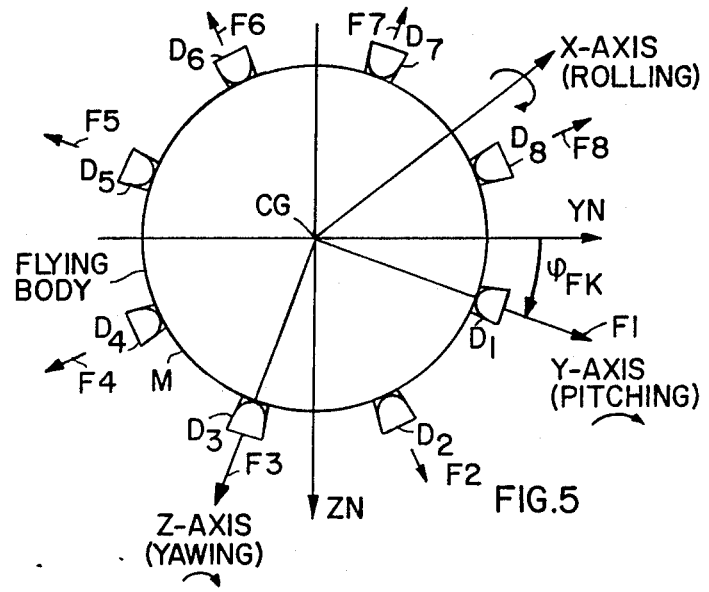

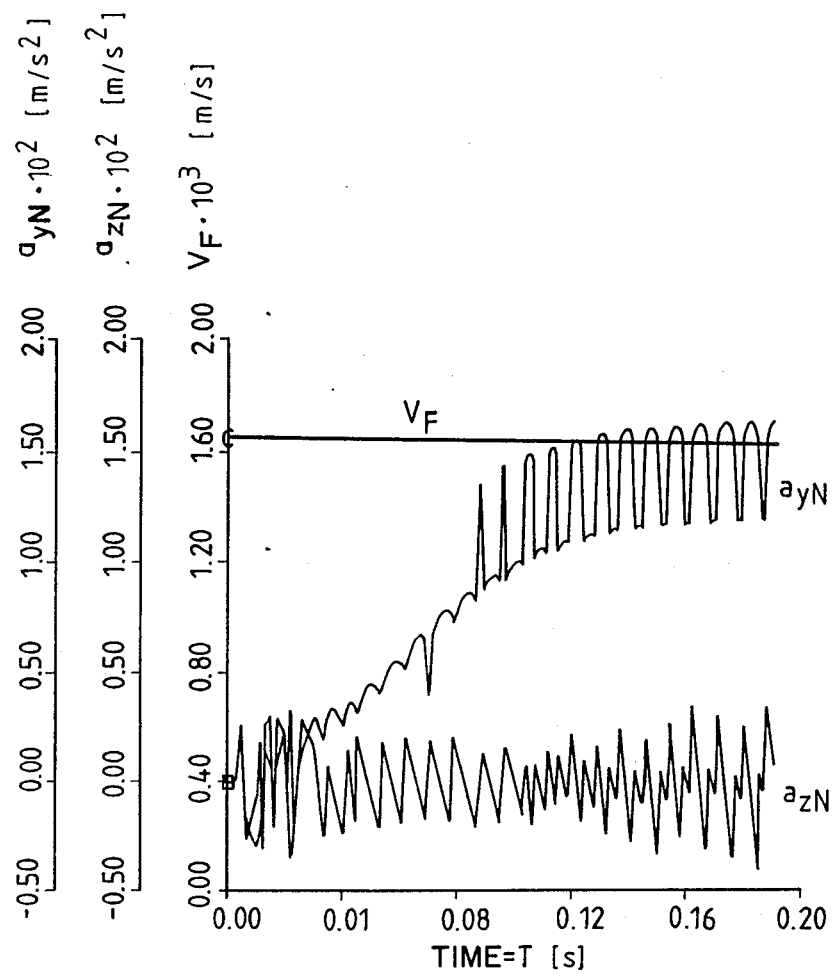
FIG.II

REMOTE CONTROL SYSTEM FOR A ROLLING FLYING BODY

FIELD OF THE INVENTION

The invention relates to a remote control system for a rolling flying body to enable such a body to perform yawing motions and/or pitching motions in addition to the rolling of the flying body about its longitudinal axis.

BACKGROUND INFORMATION

Conventional controls for flying bodies such as remote controlled weapons employ gas generators with nozzles for a pulsating throughput of the driving gases through these nozzles. Generally, these gases are hot gases. The valves for controlling the gas flow to the nozzles have operational characteristics involving dead times and rising as well as declining flanks in the characteristic valve operation curve, whereby certain delays are caused when a control valve is switched from an open state to a closed state or vice versa. Such delays are undesirable because they adversely influence the control accuracy of such weapons.

U.S. Pat. No. 3,184,182 (May et al.) discloses pulsed thrust velocity control for a projectile, such as a missile. Such a control is intended to eliminate target errors that may occur in the so-called "post boost phase", whereby the control shall counteract inertial forces, for example, caused by varying atmospheric conditions and other factors. The known system wants to assure that the missile will follow a substantially elliptical path to a target. May et al. achieve this purpose by pulsating the thrust of the propulsion jet engine of the missile. A suggestion toward the present invention is not made by this pulsating propulsion jet.

OBJECTS OF THE INVENTION

In view of the foregoing, it is the aim of the invention to achieve the following objects singly or in combination:

to provide a control system of the type mentioned above in which said dead times and delays in the control system are reduced or compensated, so that the so controlled trajectory of a missile will follow an intended flight path or trajectory rather than a conventional substantially elliptical flight path or trajectory;

to provide a control system capable of modifying the cross-force components which are effective on a missile in a direction extending crosswise to the longitudinal or roll axis of the missile, said modifying control being caused by the thrust of radially effective control nozzles so that these cross-forces can be controlled in very fine steps and individually by each control nozzle; and to make sure that the impulse duration of the impulse control signals for controlling the valves of the radially effective control nozzles, does not depend on the amplitude or size of the respective control impulse signal.

SUMMARY OF THE INVENTION

The control system according to the invention is characterized by the following features. The position adjustment or cross-force compensation is accomplished by radially effective control nozzles in the form of fluid flow nozzles distributed around the circumference of the rolling flying body. Preferably, these nozzles are uniformly spaced around the flying body or missile in a plane passing through or in front of the center of gravity of the missile. The thrust generated by these control nozzles is radially effective relative to the longitudinal rolling axis of the flying body referred to as "missile" hereafter. The control impulse signals for operating the control valves of the control nozzles in a pulsed mode of operation, are so generated and applied to these control valves that at least one pair of thrust nozzles is activated simultaneously. The impulse duration of the control impulse signals depends only on the rolling frequency of the flying body and not on the amplitude of the control signal. This is accomplished by respective threshold circuits. The control valves for the control nozzles are so controlled that the resulting cross-forces caused by the control nozzles are dosed in finely tuned steps. Preferably, the number of control valves and the number of control nozzles are equal to each other and correspond to an even whole number which is at least four. A control impulse signal generating circuit produces the control impulse signals for controlling the control valves which in turn control the control nozzles. The control impulse signal generating circuit includes a phase modulator responsive to the roll angle of the flying body. The control signals are applied in such a way that at least a pitching motion or at least a yawing motion or both motions are imposed on the flying body in addition to its rolling motion. As a result, the control valves have an operational characteristic of the on-off type. Further, at least two control valves are so operated that at least one pair of control nozzles is provided with a constant fluid throughflow.

It is an important advantage of this invention that in spite of the pulse mode of operation of the control system, the impulse duration of the control impulse signals does not depend on the size or amplitude of the control signals since the control system includes a phase modulator for modulating the control impulse signals which in turn control the control valves of the individual control nozzles. The modulation takes place in response to the rolling frequency of the flying body.

BRIEF DESCRIPTION OF THE DRAWINGS

In order that the invention may be clearly understood, it will now be described, by way of example, with reference to the accompanying drawings, wherein:

FIG. 3 shows the nozzle ring covered by flexible flaps;

FIG. 4 shows, on an enlarged scale, a section through one control nozzle along section line 4—4 in FIG. 3;

FIG. 5 shows schematically the arrangement of eight control nozzles with equal angular spacings around the circumference of a flying body relative to a fixed coordinate system X, Y, Z;

FIG. 11 illustrates the transition characteristics of the lateral accelerations $a_{YN}$ and $a_{ZN}$ in the Y- and Z-directions for a constant forward speed $V_F$ of the flying body as a function of time.

DETAILED DESCRIPTION OF PREFERRED EXAMPLE EMBODIMENTS AND OF THE BEST MODE OF THE INVENTION

Figure 1:
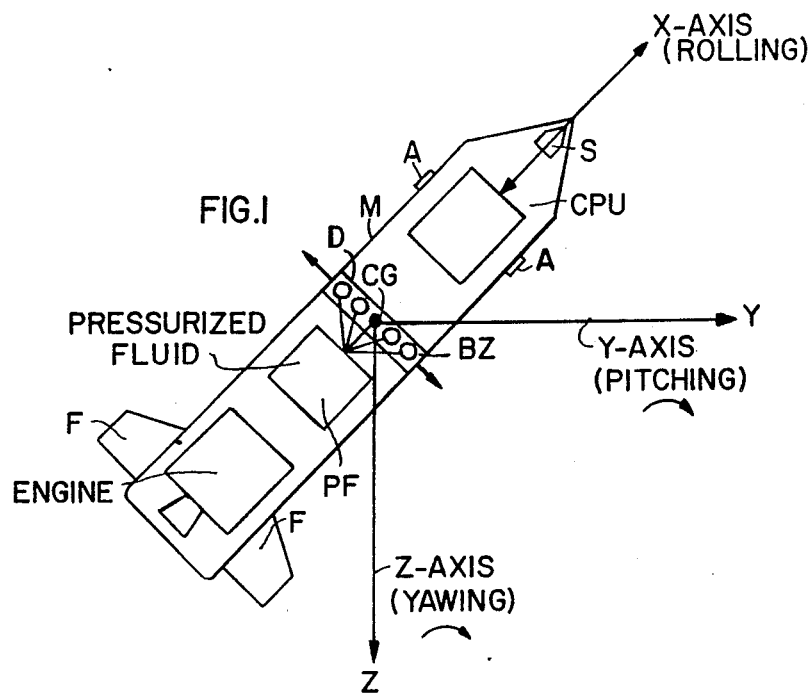
FIG. 1 shows a schematic diagram of a missile equipped with a ring of control nozzles located so that the plane through the center of gravity and perpendicularly to the roll axis passes through or behind the control nozzles, whereby the origin of an x-y-z rectangular coordinate system is also located in said center of gravity.

FIG. 1 shows a flying body or missile M having a center of gravity CG which is also the origin of a rectangular coordinate system defining the X-axis which is the rolling axis, the Y-axis, and the Z-axis. A lateral force component along the Y-axis results in a rotation around the Z-axis, whereby a yaw movement is caused. For the pitch movement the action is vice versa. A conventional engine provides the propulsion thrust. Fins F generate the rolling motion about the X-axis. A central processing unit CPU is carried on-board and receives command signals through antennas A as well as information from on-board sensors S such as roll position gyros, rate gyros, and accelerometers. According to the invention flight paths or trajectory control nozzles D are arranged around the circumference of the missile or flying body M in a circumferential zone BZ. These nozzles receive pressurized fluid from the pressurized fluid container PF, whereby the flow of fluid from the container PF into the nozzles D is controlled by control valves which will be described in more detail below. The control valves in turn receive their control signals from the central processing unit CPU.

Figure 2:
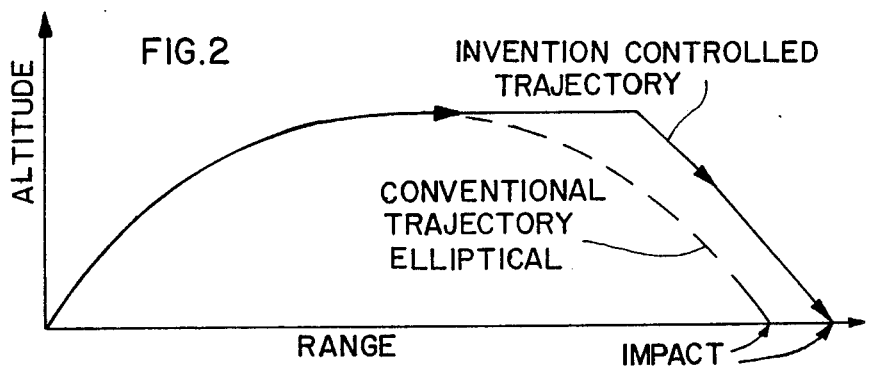
FIG. 2 shows a trajectory achieved according to the invention compared to a conventional elliptical trajectory of a missile.

FIG. 2 shows a conventional dashed line trajectory of substantially elliptical shape to be compared with a full line trajectory achieved by the control according to the invention. It will be noted that the reach of the missile can be increased by the control of the invention, thereby increasing the range and also the accuracy of the missile compared to a conventional elliptical trajectory.

FIG. 3 shows the belt zone BZ with nozzles D circumferentially integrated in the body M (see FIG. 1). The nozzles may be covered with a flap ring FR comprising a plurality of elastic cover flaps CF which have sufficient elasticity to be automatically opened when fluid under pressure passes through and close again when fluid flow stops.

FIG. 4 shows a cross-sectional view along section line 4—4 in FIG. 3 to illustrate an individual nozzle D which receives its pressurized fluid from the pressurized fluid container PF through the respective control valve to be described below. The nozzles D have longitudinal axes which are radially directed relative to the X-axis. These nozzles D are held in fixed positions in the body of the missile M.

FIG. 5 shows schematically eight nozzles D1 to D8 distributed at equal angular spacings from one another around the circumference of the flying body M merely shown as a circle in FIG. 5. The X-Y-Z-coordinate system is body-fixed and the rotation of the flying body is evaluated or measured relative to the non-rolling $X-Y_N-Z_N$-coordinate system as indicated by the roll angle $\phi_{FK}$.

Figure 6:
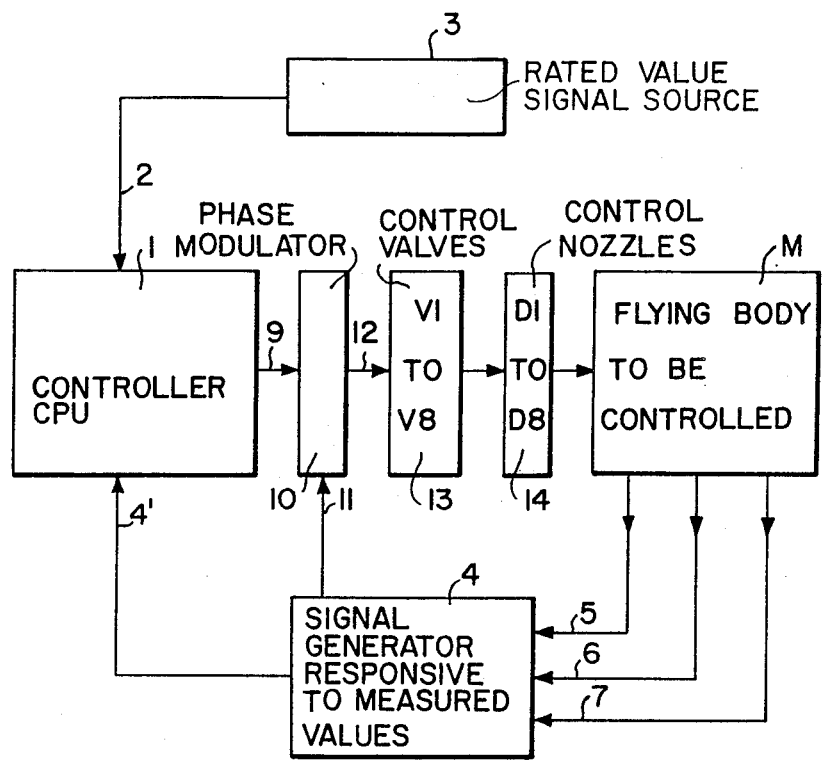
FIG. 6 is a block diagram of the control system of the invention.

FIG. 6 shows a block diagram of the present control system. The central controller or central processing unit CPU 1 receives at a first input 2 command signals in the form of so-called rated value signals from a respective source 3, for example through the antennas A seen in FIG. 1. The source 3 may be a remote control device of conventional construction. The controller CPU 1 has a second input 4' which receives measured values representing signals from a respective signal generator 4 which receives measured signal values at inputs 5, 6, and 7 connected to respective sensors S in the flying body M, as will be described in more detail below with reference to FIG. 8. The sensors measure, for example, the actual roll angle of the flying body M. A control output 9 of the CPU 1 is connected to a phase modulator 10 which is shown in more detail in FIG. 7. The modulator 10 is controlled by a signal 11 from the signal generator 4 to make sure that the duration of the control impulse signals to be supplied from an output 12 of the modulator 10 to control valves 13 is determined exclusively by the rolling frequency. The control valves 13 operate control nozzles 14 connected to the flying body M as will be described below.

The valves 13 comprise, for example, eight individual solenoid controlled fluid flow control valves V1 to V8 connected in a fluid flow duct between a respective control nozzle D1 to D8 and the pressurized fluid or propellant container PF. These nozzles are connected to the flying body or missile M as shown in FIGS. 3, 4 and 5.

Figure 7:
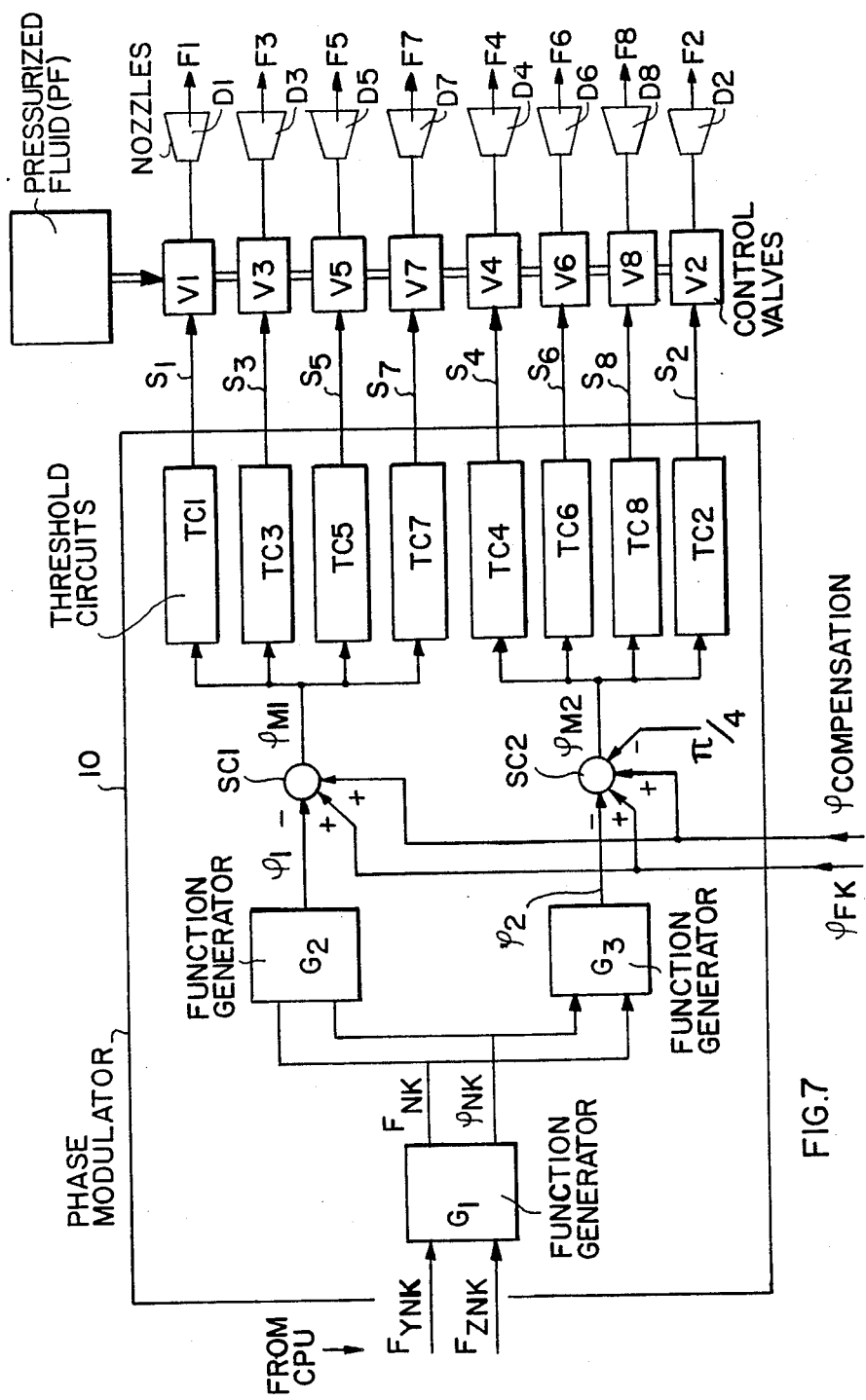
FIG. 7 shows additional details of the phase modulator circuit shown as block 10 in FIG. 6.

FIG. 7 shows further details of the phase modulator 10 of FIG. 6 comprising three function generators G1, G2, and G3. The function generator G1 receives at its inputs the command signal $F_{YNK}$ relating to the $Y_N$-axis (yaw movement) and the command signal $F_{ZNK}$ relating to the $Z_N$-axis (pitch movement) of the flying body M. The function generator G1 produces at its output a signal $F_{NK}$ and a signal $\phi_{NK}$ which are supplied to both function generators G2 and G3. These function generators G2 and G3 produce angular signals $\phi_1$ and $\phi_2$ which are supplied to respective summing circuits SC1 and SC2. The summing circuits also receive the rolling signal $\phi_{FK}$ as sensed by a roll position gyro S3 in the flying body M, see FIG. 8. Additionally, the summing circuits SC1 and SC2 receive a compensation angular signal value $\phi_{COMP}$ provided by the signal generator 4. The output of the summing circuit SC1 is a signal $\phi_{M1}$ which is supplied to four threshold circuits TC1, TC3, TC5, TC7. In other words, the value against which the signal $\phi_{M1}$ is compared, is inherently provided in each threshold circuit as a programmable function. These threshold circuits provide output control impulse signals S1, S3, S5, and S7 of defined durations for respectively operating solenoid control valves V1, V3, V5, V7, which control the respective nozzles D1, D3, D5, and D7, which produce the control forces F1, F3, F5, F7. Similarly, the summing circuit SC2 provides an angular control signal $\phi_{M2}$ to four threshold circuits TC2, TC4, TC6, TC8 of the same type as the TC1, TC3, TC5, and TC7 circuits. Control signals S2, S4, S6, S8 are supplied to the control valves V2, V4, V6, V8, for controlling the respective nozzles D2, D4, D6, and D8 producing the control forces F2, F4, F6, and F8.

The control or command input signals S1 to S8 are effective with reference to the body-fixed, rolling coordinate system. These command signals are to be formed from the non-rolling signals $F_{YNK}$ and $F_{ZNK}$. The eight control valves V1 to V8 are preferably uniformly distributed about the circumference of the flying body M as mentioned above. The valve control impulse signals S1 to S8 are so formed that the resulting control forces F1 to F8 of the respective nozzles D1 to D8 correspond precisely and with as little delay time as possible to the input command signals $F_{YNK}$ and $F_{ZNK}$ as averaged over a quarter turn of the rolling motion of the flying body M.

Figure 8:
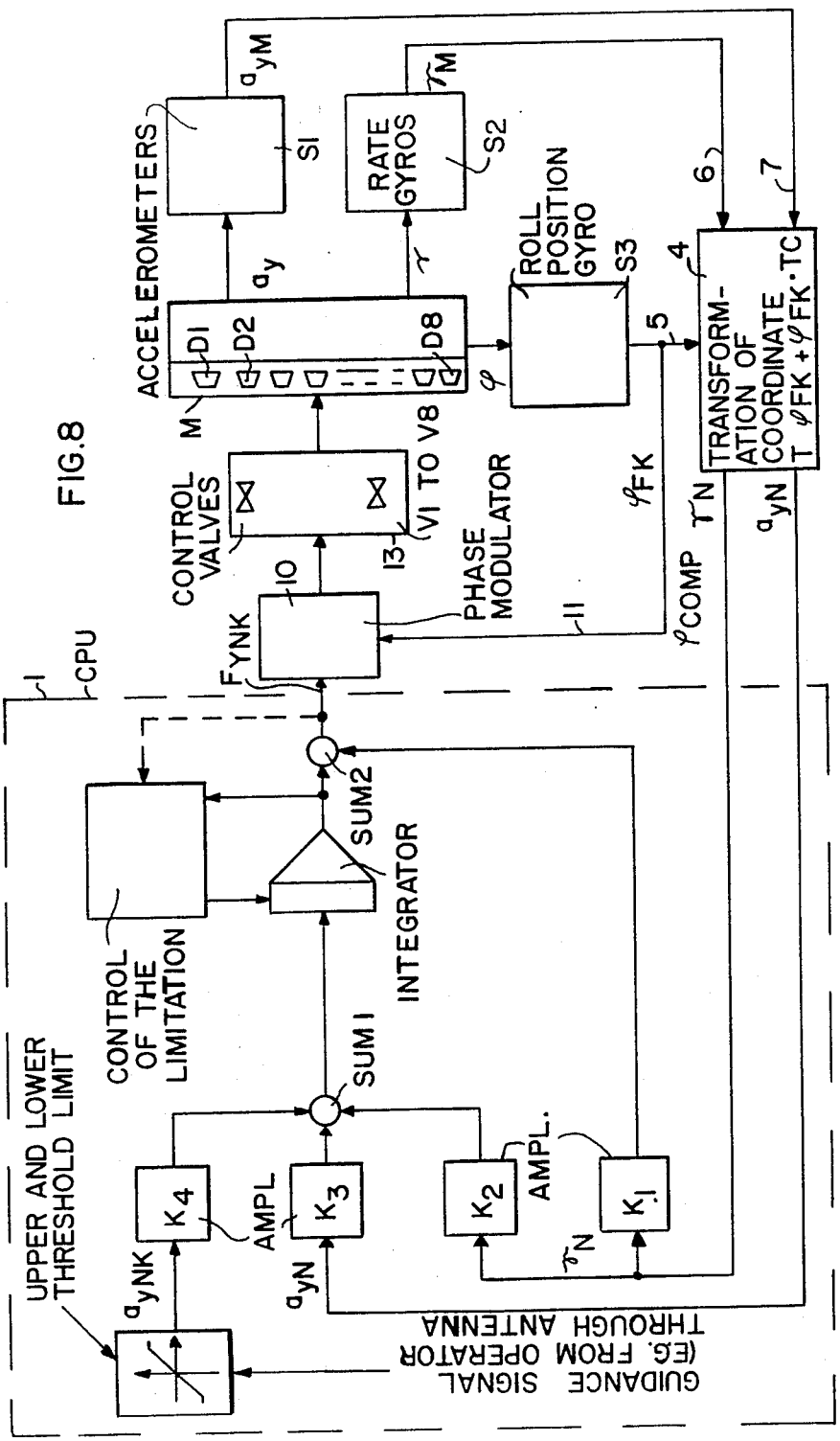
FIG. 8 is a block circuit diagram similar to FIG. 6, but showing further details of the central processing unit and of the control signal generation.

Referring to FIG. 8 the central processing unit CPU 1 is shown in the left-hand portion of FIG. 8. The individual components can be incorporated as hardware or they can be realized by means of programming. Only the channel for the Y-axis is shown. The channel for the Z-axis is analogously the same. An upper and lower threshold limit circuit receives the input signals, for example, through the antennas shown in FIG. 1 and supplies the output signal to the amplifier K4, the output of which is supplied to a first summing circuit SUM1, which receives signals from two further amplifiers K3 and K2. The upper and lower threshold limit circuit may provide a limit of $\pm 500$ m/s$^2$, whereby a control range for the valves V1 to V8 and accordingly for the nozzles D1 to D8 is established.

The amplifiers K1, K2, and K3 receive the respective output signals from the coordinate transformation of the circuit 4 as shown in FIG. 8. The circuit 4 is programmed to perform the respective coordinate transformation as indicated by the formula. The first summing circuit also receives the output from the amplifiers K2 and K3 and supplies the summing signal to an integrator. The amplifier K1 supplies its output signal to a second summing circuit SUM2 which also receives the output from the integrator. A circuit which controls the desired limitation may be used optionally. This circuit determines the transient characteristic of the CPU 1. The labels in the right-hand part of FIG. 8 are self-explanatory.

The following parameters must be taken into account for producing the control impulse or command signals S1 to S8 for the respective valves V1 to V8. These valves must have a distinct on-off or logic "1" and logic "0" characteristic. In practice such an ideal characteristic is not fully realizable. Therefore, any dead times and rising and falling flanks or slopes in the operational characteristic of the respective control valve when it switches from the "on" to the "off" state and vice versa, must be taken into account. Further, if the control nozzles are operated by hot gas from the container PF a constant average gas throughput must be assured in order to maintain or satisfy the operational conditions of the gas generator. This constant average throughput must correspond to the throughput of two nozzles forming the above mentioned pair.

The first function generator G1 of the phase modulator 10 shown in FIG. 7 is capable of transforming the rectangular coordinate input command signals $F_{YNK}$ and $F_{ZNK}$ into control signals in a polar coordinate system $F_{NK}$ and $\phi_{NK}$.

$$F_{NK} = \sqrt{F_{YNK}^2 + F_{ZNK}^2};$$

limitation:

$$F_{NK} \leq \sqrt{2} \cdot \frac{4}{\pi} \cdot F_D;$$

wherein FD is the thrust or force exerted by the respective control nozzle D1 to D8

$$\phi_{NK} = \text{Arc tg} \frac{F_{ZNK}}{F_{YNK}}$$

The function generators G2 and G3 produce the phase angles $\phi_1$ and $\phi_2$ as follows:

$$\phi_0 = \tfrac{1}{2}\left( -\pi + \arccos\left[ 1 - \left( \frac{\pi}{4} \cdot \frac{F_{NK}}{F_D} \right)^2 \right] \right)$$

$$\phi_1 = \phi_{NK} + \phi_0 \cdot \text{sign}(\phi_{NK})$$

$$\phi_2 = 2 \cdot \phi_{NK} - \phi_1 - \pi \cdot \text{sign}(\phi_{NK})$$

The signals $\phi_{M1}$ and $\phi_{M2}$ are formed as follows:

$$\phi_{M1} = \phi_{FK} - \phi_1 + \phi_{COMP}$$

$$\phi_{M2} = \phi_{FK} - \phi_2 + \phi_{COMP} - \frac{\pi}{4}$$

The angle $\phi_{FK}$ is the rolling angle of the flying body M relative to the non-rolling coordinate system $X\text{-}Y_N\text{-}Z_N$ $$\phi_{COMP} = \dot\phi_{FK} \cdot T,$$

wherein T is the signal for compensating the dead time and any delays otherwise caused by components of the system. $\phi_{COMP}$ is the compensation angle.

The threshold circuits TC1, TC3, TC5, and TC7 form the signal $\phi_{M1}$ into the command signals S1, S3, S5, and S7. The threshold circuits TC2, TC4, TC6, and TC8 form the command or control impulse signals S2, S4, S6, and S8. The switching or threshold conditions for the eight threshold circuits are set forth in the following Table.

| Threshold Circuit | Control Impulse Signal | Switching or Threshold Conditions | |
|---|---|---|---|
| | | Valve "ON" | Valve "OFF" |
| TC1 | S1 | $\cos \phi_{M1} > 1/\sqrt{2}$ | $\cos \phi_{M1} \leq 1/\sqrt{2}$ |
| TC3 | S3 | $-\sin \phi_{M1} > 1/\sqrt{2}$ | $-\sin \phi_{M1} \leq 1/\sqrt{2}$ |
| TC5 | S5 | $-\cos \phi_{M1} > 1/\sqrt{2}$ | $-\cos \phi_{M1} \leq 1/\sqrt{2}$ |
| TC7 | S7 | $\sin \phi_{M1} > 1/\sqrt{2}$ | $\sin \phi_{M1} \leq 1/\sqrt{2}$ |
| TC4 | S4 | $\cos \phi_{M2} > 1/\sqrt{2}$ | $\cos \phi_{M2} \leq 1/\sqrt{2}$ |
| TC6 | S6 | $-\sin \phi_{M2} > 1/\sqrt{2}$ | $-\sin \phi_{M2} \leq 1/\sqrt{2}$ |

-continued

| Threshold Circuit | Control Impulse Signal | Switching or Threshold Conditions | |
|---|---|---|---|
| | | Valve "ON" | Valve "OFF" |
| TC8 | S8 | $-\cos \phi_{M2} > 1/\sqrt{2}$ | $-\cos \phi_{M2} \leq 1/\sqrt{2}$ |
| TC2 | S2 | $\sin \phi_{M2} > 1/\sqrt{2}$ | $\sin \phi_{M2} \leq 1/\sqrt{2}$ |

Figure 9:
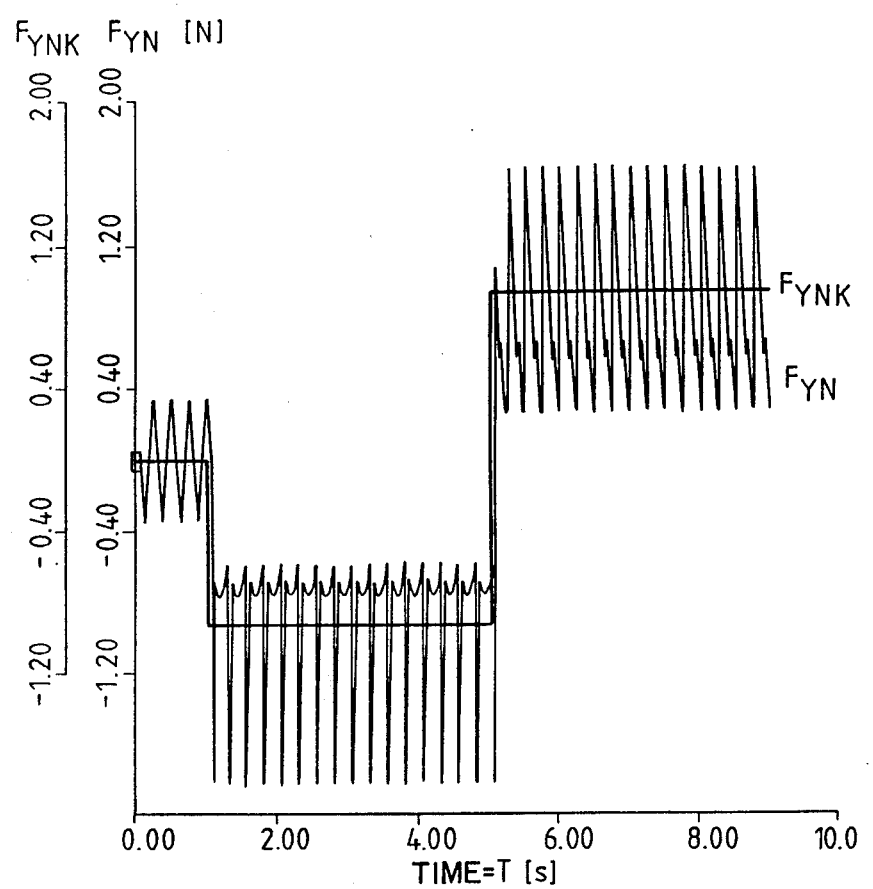
FIG. 9 shows the signal characteristic of a commanded adjustment value or force $F_{YNK}$ (in Newton) and of a realized adjustment value or force $F_{YN}$ (in Newton) in the fixed, non-rolling coordinate system as a function of time relative to the Y-axis of such coordinate system as a function of time.
Figure 10:
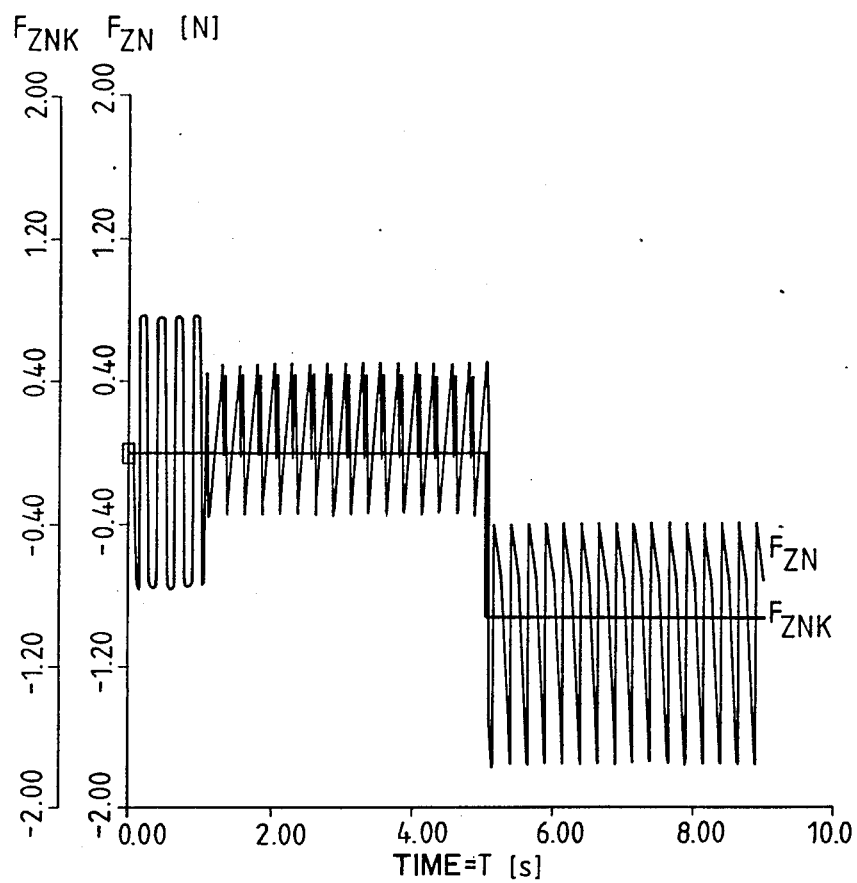
FIG. 10 is an illustration similar to that of FIG. 9, but showing the respective commanded adjustment value or force $F_{ZNK}$ (in Newton) and the realized adjustment value or force $F_{ZN}$ (in Newton) in the fixed coordinate system relative to the Z-axis as a function of time.

FIGS. 9 and 10 show the time-histories of the command signals $F_{YNK}$ and the realized force $F_{YN}$ (in Newton) for the yaw-channel and $F_{ZNK}$, $F_{ZN}$ (in Newton) as a function of time for the pitch-channel.

A system built according to the present invention has been tested in the laboratory and had the following operational characteristics:

| | |
|---|---|
| Angular rolling speed | $\dot{\phi}_{FK} = 2\alpha$ rad/s = 1 U/s (rps) |
| thrust of a nozzle | F = 1 N (Newton) |
| delay time of a nozzle | $T_s$ 62.5 millisecond |

The time characteristic of the command signals is as follows:

| |
|---|
| $0 \leq t < 1$ s; $F_{YNK} = 0$; $F_{ZNK} = 0$ |
| $1 \leq t < 5$ s; $F_{YNK} = -0.9$ N; $F_{ZNK} = 0$ |
| $5 \leq t < 9$ s; $F_{YNK} = 0.9$ N; $F_{ZNK} = -0.9$ N |

The actually realized thrust or adjustment forces $F_{YN}$ or $F_{ZN}$ exerted by the control nozzles correspond exactly to the command signals $F_{YNK}$ or $F_{ZNK}$ respectively averaged over a quarter turn taking place in 0.25 s.

The command signals S1, S3, S5, and S7 applied to the respective control valves V1, V3, V5, V7 achieved sequentially and in uninterrupted steps, the switching condition "ON" so that always, or rather at any time one uneven numbered nozzle is opened or operating. Independently of the size of the command signal every fourth uneven numbered control nozzle is operated for the duration of a quarter turn. The size of the command signal influences only the phase position which determines the operating of the respective nozzle relative to the roll angle of the flying body. The same considerations apply to the even numbered control or command signals S2, S4, S6, and S8, so that at any one time an even numbered and an uneven numbered nozzle is operated simultaneously.

In the shown example phase shifts or jumps take place at the times T=1 s and T=5 s as shown in FIGS. 9 and 10.

FIG. 11 shows, as a function of time, the non-rolling signals $a_{yN}$ and $a_{zN}$ as provided by the respective separate accelerometers shown at S1 in FIG. 8 and the coordinate transformation 4 in FIG. 8.

Modifications of the shown example are possible for controlling control valves for other purposes. The described phase modulation method for controlling control valves having a distinct "ON-OFF" characteristic, can be employed in any situation where an even number including four and higher, of valves, such as servo-valves, is used. The servo-valves need to be distributed around the respective body at equal angular spacings and provided further that always two servo-valves shall be activated simultaneously or in pairs.

Although the invention has been described with reference to specific example embodiments, it will be appreciated that it is intended to cover all modifications and equivalents within the scope of the appended claims.

What I claim is:

1. A remote control system for controlling pitching and yawing movements of a rolling flying body, comprising a plurality of radially arranged fluid flow control nozzles located around the circumference of said flying body, said control nozzles providing control forces for influencing movements of said flying body, a control valve operatively connected to each control nozzle for individually controlling fluid flow through the respective control nozzle, impulse signal control circuit means for providing control impulse signals to each of said control valves in such a way that at any time at least two control nozzles forming a cooperating pair of control nozzles, are activated for controlling fluid flow from a source of pressurized fluid to said nozzles for a duration determined by said control impulse signals, and means for sensing a roll angle of said flying body for supplying a respective roll angle signal to said impulse signal control circuit means so that the impulse duration of said control impulse signals is determined exclusively by a rolling frequency of said flying body.

2. The system of claim 1, wherein said control nozzles are spaced from each other at equal angular spacings from each other around said flying body.

3. The system of claim 1, wherein said plurality of control nozzles and respective control valves comprises an even number of at least four control nozzles and at least four control valves, and wherein said impulse signal control circuit means comprise impulse signal phase modulator means for supplying a phase modulated control impulse signal to the respective control valves for rotating said flying body about at least one of its yaw axis and its pitch axis.

4. The system of claim 1, wherein said control valves have a distinct on-off characteristic for a fine control.

5. The system of claim 1, wherein at least two of said control valves forming a pair are adjusted to provide a constant fluid through-flow for said one pair of said control nozzles.

6. The system of claim 1, wherein said control nozzles are arranged in a belt zone around said flying body, and wherein a radial plane passing through or in front of the center of gravity of said flying body also passes through said belt zone.

7. A method for controlling pitching and yawing movements of a rolling flying body, comprising the following steps:
 (a) arranging a plurality of control nozzles in a circumferential belt zone of said flying body,
 (b) connecting one control valve to each of said control nozzles;
 (c) producing control impulse signals in response to a roll angle of said flying body so that the rolling frequency determines the impulse duration of said control impulse signals, and
 (d) controlling the operation of said control valves with said control impulse signals in such a way that at any time at least two control nozzles forming a cooperating pair of even numbered and uneven numbered control nozzles is activated for performing at least one of said pitching and yawing movements.

8. The method of claim 7, wherein said control impulse signals control fluid flow through said control nozzles in small steps, whereby resultant control forces are also applied in small steps.

9. The method of claim 7, comprising spacing neighboring nozzles at equal angular spacings from each other.

* * * * *